June 29, 1954  L. A. MARIHART  2,682,132
AGRICULTURAL MACHINE
Filed May 14, 1948  4 Sheets-Sheet 1
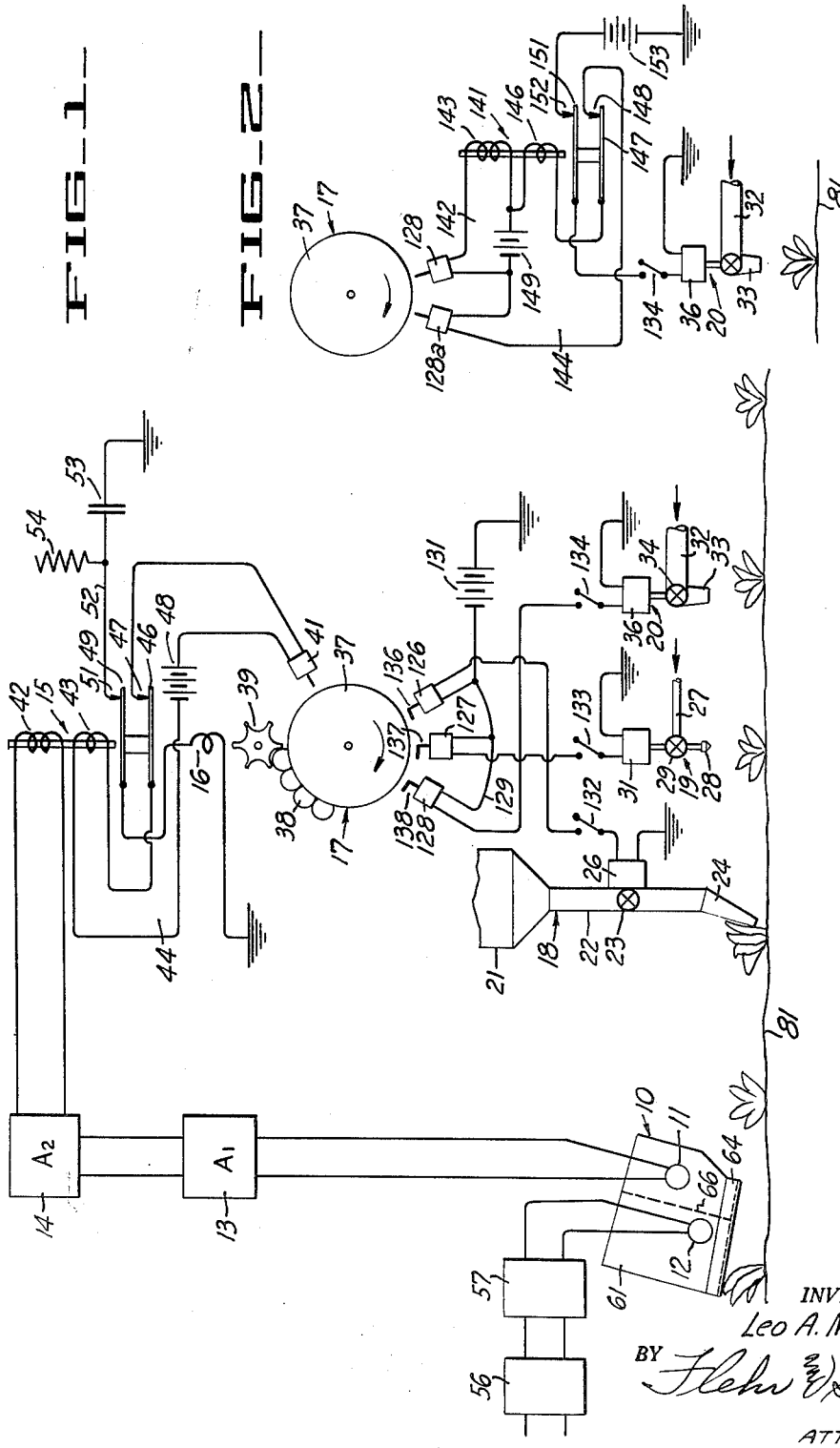
INVENTOR.
Leo A. Marihart
BY Flehr & Swain
ATTORNEYS June 29, 1954  L. A. MARIHART  2,682,132
AGRICULTURAL MACHINE
Filed May 14, 1948  4 Sheets-Sheet 2
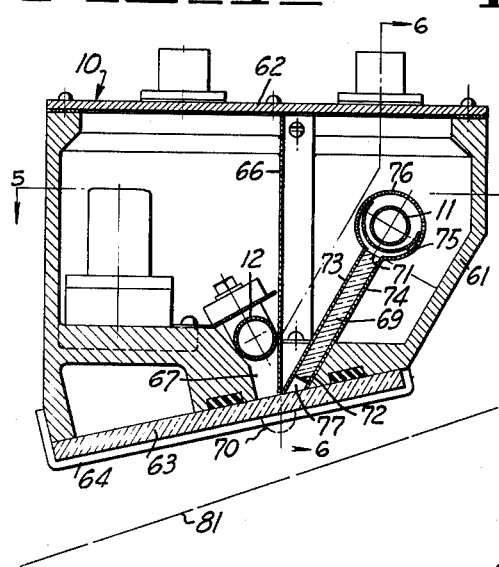
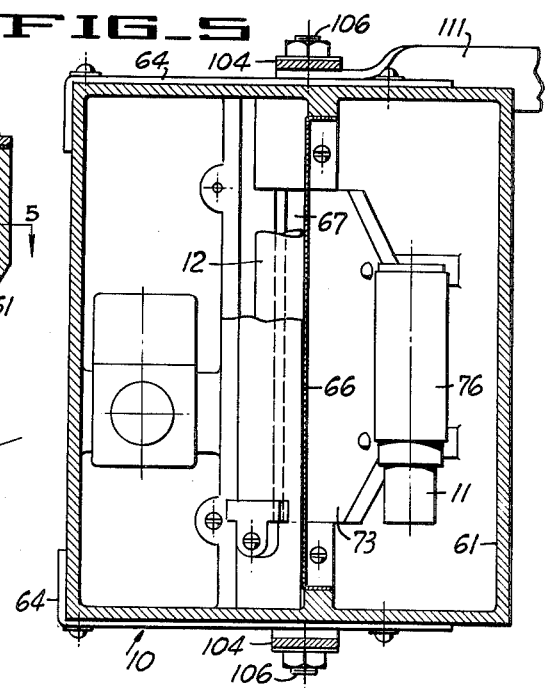
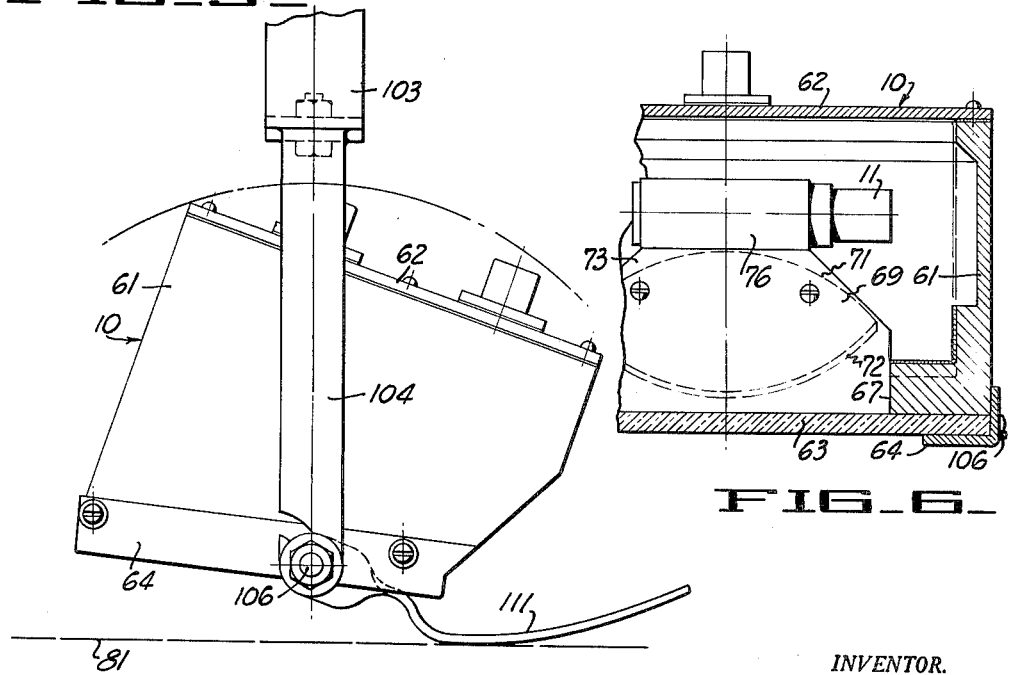
INVENTOR.
Leo A. Marihart
BY
ATTORNEYS

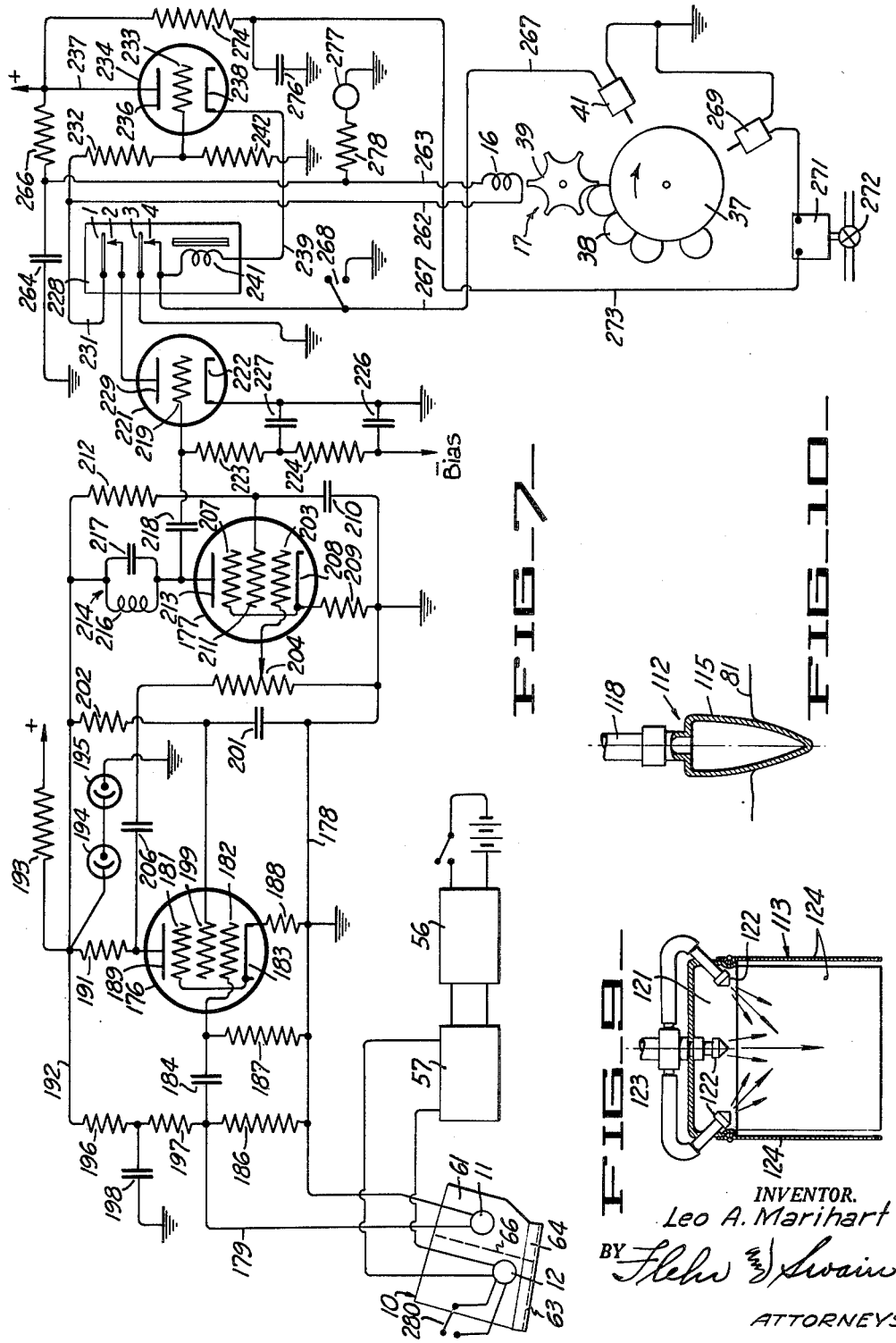

June 29, 1954 — L. A. MARIHART — 2,682,132
AGRICULTURAL MACHINE
Filed May 14, 1948 — 4 Sheets-Sheet 4
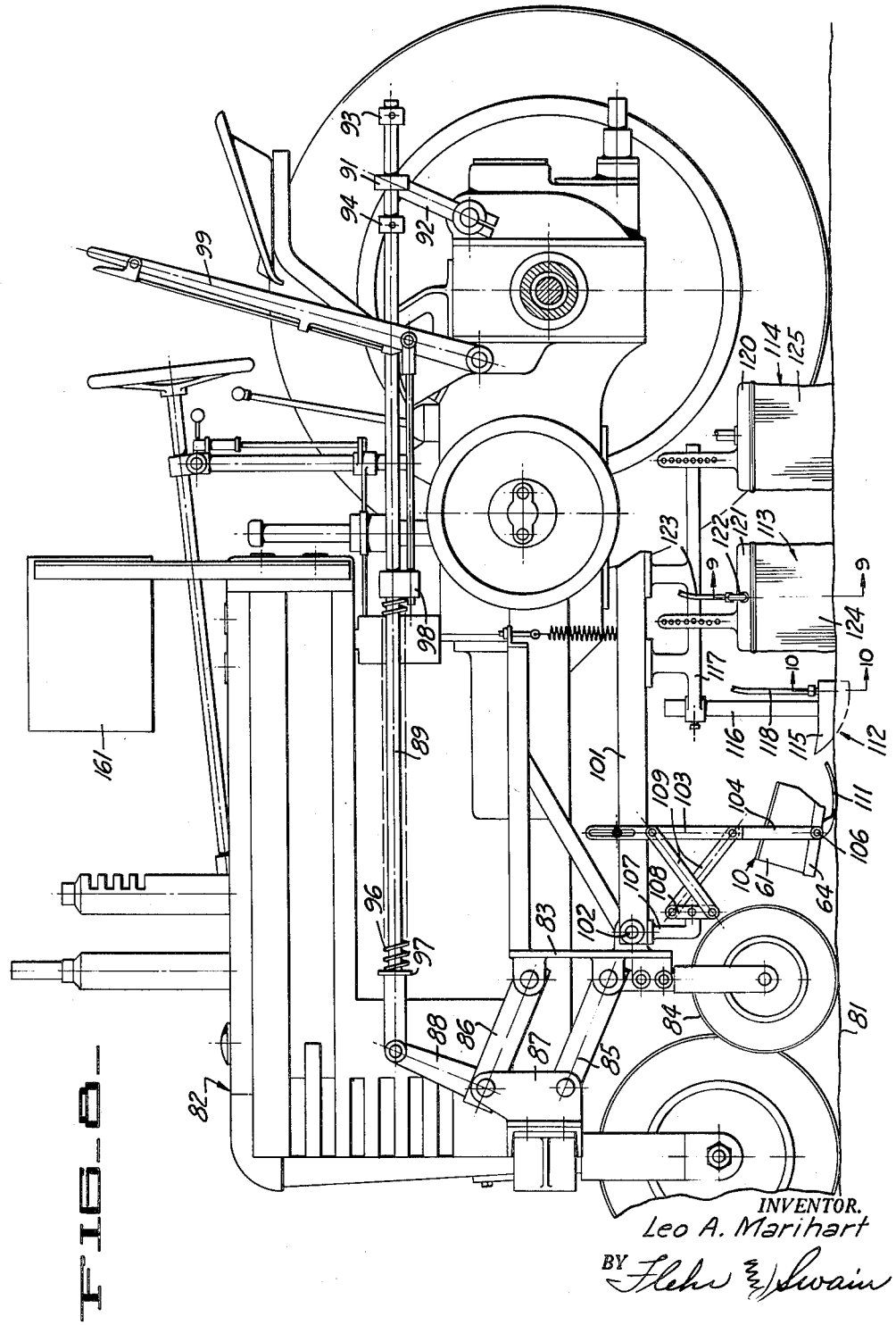
INVENTOR.
Leo A. Marihart
BY
ATTORNEYS Patented June 29, 1954

2,682,132

UNITED STATES PATENT OFFICE 2,682,132

AGRICULTURAL MACHINE

Leo A. Marihart, Monterey County, Calif., assignor to M. P. H. Industries, Palo Alto, Calif., a corporation of California Application May 14, 1948, Serial No. 27,090

5 Claims. (Cl. 47—1)

This invention relates generally to agricultural machines for the treatment of various plants, and particularly to machines for such operations as fertilizing, spraying and weed control.

In the care or culture of field plants it is common to apply fertilizers and other soil treatment chemicals relatively indiscriminately. For example where the plants are grown in straight rows, it is common to apply nitrates, phosphates, potash and other chemical fertilizers or plant conditioners by the use of a hollow or trough-like shoe which is supplied with a continuous stream of fertilizer, and which is moved along a plant bed through the upper surface of the soil, thereby leaving a continuous line of fertilizer in close proximity with the plant row, and which is subsequently dissolved by water. This method is selective to the extent that the fertilizer is not applied over the entire ground surface, but it does not discriminate with respect to location of plants in the row. It is well known that only the fertilizer deposited in close proximity with a plant is effective in promoting its growth, and assuming that the plants are spaced from 10 to 24 inches or more apart, which is generally the case, it is evident that a large amount of the fertilizer is not effectively applied. A considerable part of the fertilizer applied in this fashion is ultimately dissipated by rain or irrigation water, and is therefore largely wasted.

With respect to conventional practice in applying liquid or powdered sprays (e. g. insecticidal or plant treatment sprays) to field plants, it is known that in many instances the spray is most effectively applied when directed downwardly from a region above the plant. Assuming again that the plants are in rows spaced apart a considerable distance, it is customary practice to traverse the rows with continuously discharging nozzles, whereby a considerable part of the spray is not effectively applied to the plants but is discharged upon the ground and wasted. In some instances the spray may not only be wasted in this manner, but also may be detrimental to the soil.

In recent years several chemicals and chemical compounds and mixtures have been developed for the purpose of killing or controlling growth of weeds and like vegetation other than the desired plant. When such sprays are effectively applied there may be a considerable saving, particularly in that elimination or control of the weeds may make it unnecessary to carry out more expensive weed eradicating operations. If such spray materials are discharged continuously from spray nozzles, arranged to operate between the rows of plants, then care must be taken not to extend the area of application of the spray to the plants themselves. Therefore the spray is not applied to weeds which may be growing in areas between the plants. Selective application of such sprays manually is not feasible, because of the high labor costs involved.

It is an object of the present invention to provide a machine and method capable of automatically carrying out the operations described above with a high degree of selectively.

Another object of the invention is to provide a machine and method of the above character which is capable of effecting great economies in such agricultural operations as fertilizing, application of spray materials, application of weed eradicators, etc.

Additional objects of the invention will appear from the following description in which the preferred embodiment has been set forth in detail in conjunction with the accompanying drawing.

Referring to the drawing:

Figure 1 is a side elevational view illustrating a complete equipment of the type utilizing the present invention.

Figure 2 is a circuit diagram illustrating a modification of the equipment shown in Figure 1.

Figure 3 is a side elevational view illustrating a photoelectric tube unit such as is utilized in conjunction with the invention.

Figure 4 is another view of the unit shown in Figure 3, but in cross section, illustrating the arrangement of parts within the box.

Figure 5 is a cross-sectional view taken along the line 5—5 of Figure 4.

Figure 6 is a cross-sectional detail taken along the line 6—6 of Figure 4.

Figure 7 is a circuit diagram illustrating a suitable electronic network for coupling to the photoelectric tubes, and for effecting electric control of the timing device.

Figure 8 is a side elevational view showing a tractor equipped with the present invention, and illustrating particularly the photoelectric unit, and means for applying fertilizer and for applying spray materials.

Figure 9 is an enlarged cross-sectional detail taken along the line 9—9 of Figure 8.

Figure 10 is an enlarged cross-sectional detail takent along the line 10—10 of Figure 8.

The invention can best be explained after describing the diagrammatic Figure 1. A photoelectric unit 10 includes the photoelectric tube 11, and the lamp 12. Tube 11 connects to the input of an electronic amplifier 13, which in turn has its output coupled to the input of the power amplifier 14. The output of the amplifier 14 connects to the relay 15, which in turn serves to control the solenoid 16 of the timing device 17. The timing device 17 serves in turn to effect timed operation of the fertilizer applying device 18, and the spray applying device 19 and the dusting appliance 20.

The fertilizer applying device 18 may vary as to details but in this instance it is illustrated as comprising a hopper 21 adapted to contain various fertilizer materials in powdered form, and arranged to feed the material downwardly through pipe 22, control valve 23, and discharge spout 24. In a typical instance spout 24 can discharge the fertilizer over an area adjacent to the plants, or as will be presently explained, a suitable shoe can be employed to deposit the fertilizer into the upper layer of soil adjacent the plants. Valve 23 is adapted to be operated by the electric solenoid 26.

The spray device 19 has been shown diagrammatically as comprising simply a pipe 27 provided with the spray nozzle 28, and controlled by valve 29. Electrical solenoid 31 serves to operate the valve 29. Pipe 27 leads to a suitable tank for liquid spray material under pressure.

Device 20 has been shown diagrammatically as comprising the conduit 32 having a downwardly directed discharge nozzle 33, and controlled by valve 34. Solenoid 36 serves to operate the valve 34. Pipe 32 connects with a source of air under pressure together with suitable powder feeding means. Upon opening valve 34 powder, such as a suitable insecticide, or fungicide, is discharged downwardly upon the plants.

The timing device 17 can be of the type disclosed in my Patent No. 2,437,168, granted March 2, 1948. Briefly this type of timing device comprises a continuously rotating wheel or pulley 37, having its periphery frictionally engaged by the elements 38. Elements 38 may be small magnetic members frictionally retained to the periphery of the wheels 37 by magnetic attraction, or as disclosed in said patent they may be made in such a manner as to have frictional engagement with the wheel. Normally a plurality of elements 38 are retained in single file upon the wheel 37 by the releasable star wheel 39. A suitable trigger arrangement, controlled by solenoid 16, is provided for retaining star wheel 39 stationary. Upon releasing the trigger means star wheel 39 is permitted to rotate a sufficient distance to release one of the elements 38. The released element then moves on the wheel 37, until it takes a position at the end of the row of elements.

In order to minimize the possibility of false operation, the relay 15 is preferably of the type having a holding circuit and a pair of holding contacts, and used in conjunction with the release switch 41. Thus the magnet of the relay 15 is provided with two coils 42 and 43, the former being connected to the output of the amplifier 14, and the latter being included in the holding circuit 44. Movable and stationary relay contacts 46 and 47 are connected in series with circuit 44, and this circuit also includes the battery 48 or other source of current, and the switch 41. Thus when winding 42 is energized the contacts 46 and 47 are closed to supply holding current to the winding 43, and this holding circuit remains closed until operation of the switch 41. The main movable and stationary contacts 49 and 51 of the relay are included in a circuit for energizing the solenoid 16. Thus one side of this solenoid is shown connected to ground and the other side connected to the movable contact 49. Stationary contact 51 is connected by conductor 52 to one side of the condenser 53, and the other side of this condenser is connected to ground. A resistor 54 connects between conductor 52 and a source of condenser charging current. When contacts 49 and 51 are opened condenser 53 is charged by current supply to resistor 54. When the contacts 49 and 51 are closed the condenser discharges through the solenoid 16, thus operating this solenoid to release the star wheel 39. Closing of contacts 49 and 51 is accompanied by closing of the contacts 46 and 47, to close the holding circuit 44, and as a result the relay contacts remain closed until a released element 38 operates the switch 41, at which time the opening of the holding circuit 44 permits the relay contacts to open.

In order to exclude the effect of daylight or other extraneous illumination, I make use of a pulsating source of light together with a tuned or selective amplifier system. Thus the lamp 12 is preferably of the gas discharge fluorescent type, and is excited with the pulsating current at a definite frequency of say 115 pulsations per second. The so-called daylight type of tube has given good results. The current supply source for this lamp has been shown including the pulsator or vibrator 56, together with the transformer 57. The pulsator or alternating current thus applied to the lamp 12 serves to produce pulsating illumination. The photoelectric cell or tube 11 is receptive to light produced by the lamp 12 and reflected back from a plant, and the amplifiers 13 and 14 are selectively tuned to amplify pulsations only such as are produced by the light source, which for the lamp exciting current frequency of 115 cycles per second, will be 230 cycles per second.

A suitable type of photoelectric unit is illustrated in Figures 3 to 6 inclusive. Briefly it consists of a box-like housing 61 having a removable top cover 62, and a transparent bottom plate or wall 63 preferably made of glass. The glass wall is secured to the sides of the box by means of the side retaining clamps 64. Within the box and between the photoelectric tube 11 and lamp 12 there is a partition wall 66, which extends downwardly to a point substantially in contact with the inner face of the plate 63. On one side of the partition 66, and extending between the lamp 12 and the glass wall 63, there is a slot or elongated space 67 through which light is transmitted from the lamp. Upon the other side of the partition 66, means is provided for collecting reflected light and for applying it to the photoelectric tube 11. This means consists of a relatively flat lens 69 made of suitable material such as a transparent plastic, and having upper and lower arcuately curved edges 71 and 72. This lens is retained within a suitable opaque housing which includes the metal plates 73 and 74, and the metal shroud 76 for the photoelectric tube 11. The lower edges of plates 73 and 74 terminate in contact with the inner face of the glass wall 63 as illustrated in Figure 4. The lens 69 collects light from a space 77 which is substantially coextensive to the length of slot 67 (see Figure 6) and serves to concentrate the collected light upon the relatively shorter photoelectric tube 11. A suitable light filter 75 is shown positioned between tube 11 and the lens 69.

From Figure 4 it will be noted that light being transmitted downwardly through the glass plate from the lamp 12 is directed substantially at right angles to the plane of the plate. Therefore a portion of a plant caused to occupy the zone indicated at 70, extending coextensive with the length of slot 67, is illuminated, and light reflected from this plant portion is caused to be reflected back through the glass plate and to be collected by the lens 69, for application to the photoelectric tube 11. Lens 69 is disposed at a substantial angle to the glass plate, as for example at an angle of approximately 45° as illustrated, so that the majority of light reflected from the surface of the glass plate 63 is not collected and applied to the photoelectric tube. Line 81 in Figure 4 represents the ground surface, and the movement of the unit is preferably from right to left. Assuming application to relatively small plants, the device is arranged to pass over the row of plants in such a manner that the plants are bent over and caused to pass beneath the plate 63. Light is therefore reflected from the bent over stem portions or the lower leaves of the plants, for effecting a light response of the photoelectric tube 11. Foliage continually wipes over the lower surface of the plate 63, thus keeping it relatively free of dust.

Various arrangements can be used for mounting the photoelectric unit on a tractor or like vehicle for movement along a row of plants. Preferably it is mounted in advance of fertilizing, and plant spray or dusting devices. One suitable arrangement is illustrated in Figure 8. A motor powered tractor or like vehicle 82 is provided with a frame 83, carried by the small wheel 84. Parallel links 85 and 86 attach the frame 83 to the mounting bracket 87 attached to the tractor frame. A lever arm 88 is fixed with respect to link 86, and connects with an operating rod 89 which extends to the rear of the tractor, where it slidably extends through the collar 91 carried by arm 92. Arm 92 connects with a hydraulic operator provided on the tractor. Adjustable collars 93 and 94 are fixed to the rod 89, whereby when lever 92 is swung to the left, rod 89 is moved to the left to raise the frame 83. A counterbalancing compression spring 96 surrounds the rod 89, and has its one end seated upon the shoulder 97, and its other end on the collar 98. The position of collar 98 can be adjusted by changing the setting of the hand lever 99. Thus a desired amount of spring force can be yieldably applied to lever 88, in a direction to counterbalance the weight of frame 83 and parts carried by the same.

A structural member 101 is pivotally attached at 102 to the frame 83. The photoelectric unit 10 is carried by member 101 and frame 83, preferably in such a manner as to permit its independent vertical movement. Thus a pair of spaced parallel bars 103 extend vertically on opposite sides of the member 101, and the lower ends of these bars are attached to a yoke 104, which embraces the photoelectric unit 10. The lower ends of the yoke are attached by studs 106 to the clamp brackets 64 of the photoelectric unit. A bracket 107 carried by the frame 83 serves to pivotally mount a pair of levers 108. These levers are connected to the bars 103 by the cross connected links 109. With this arrangement the bars 103, together with the photoelectric unit 10, move in a rectilinear and vertical direction to accommodate for variations in ground level. If desired a suitable counterbalance spring can be applied between bars 103 and the member 101, to offset in part the weight of the photoelectric unit and associated parts. Also it is desirable to provide a small ground engaging runner or shoe 111 mounted upon the photoelectric unit (see Figure 3) in order to maintain the same at a substantially constant distance from the ground surface.

The various plant treating devices 18, 19 and 20 described generally with reference to Figure 1, can all be suitably carried by the frame of the tractor and preferably mounted upon the member 101. Figure 8 illustrates a modified type of fertilizing device 112, and more elaborate applying devices 113 and 114. Device 112 makes use of a hollow runner or shoe 115 which is attached to the lower end of rod 116. This rod is adjustably carried by the bracket 117, which in turn is mounted upon member 101. The interior of the shoe connects with a pipe or hose 118, and which may for example be an extension of the pipe 22 of Figure 1. The rear end of the shoe 115 is open for the discharge of fertilizer. Figure 10 illustrates how the shoe operates through the ground whereby powdered fertilizer is discharged into a trough formed in the ground. This trough may be relatively close to the plant row.

Device 113 (Figure 9) consists of a simple frame 121 attached to bracket 117 and serving to mount the liquid spray nozzles 122. These nozzles connect to a common pipe 123, which may correspond for example to the pipe 27 of Figure 1. Flexible cloth curtains 124 are draped from frame 121 to enclose a spray applying space.

Device 114 is for application of powdered materials and may consist of a frame 120 attached to bracket 117 and from which curtains 125 are draped to enclose a dusting zone. Pipe 33 (Figure 1) communicates with the space enclosed by the curtains.

Referring back to Figure 1, means is employed in conjunction with the timer 17 for effecting automatic and properly timed operation of the devices 18, 19 and 20, or devices 112, 113 and 114 of Figure 8, responsive to a light indication secured from a plant by the photoelectric unit 10. Thus the timer is provided with switches 126, 127 and 128, serving to control respectively the operation of solenoids 26, 31 and 36. One terminal of each of the switches 126, 127 and 128 is shown connected to a common conductor 129, which in turn connects to the battery 131 or other source of current, and thence to ground. One side of solenoid 26 is connected to ground, and the other side is connected through switch 132 to the timer switch 126. Solenoid 31 has one side connected to ground and the other side connected through switch 133 to the timer switch 127. Solenoid 36 has one side connected to ground and the other side connected through switch 134 to the timer switch 128.

All of the timer switches can be of the type having snap action of their contacts, and actuated by relatively small movement of an operating member. The operating members 136, 137 and 138 for the switches 126, 127 and 128 are indicated as extended wires bent laterally at their ends in order to prolong engagement with the element 38.

It will be evident that when an element 38 is released to travel with the rotating wheel 37, it will first effect operation of switch 41, and then successively engage the operating elements of the other switches. The time period during which each switch is operated will depend in part upon the time period of contact with the element 38, and this can be controlled by the length of the operating element provided for the switch. It will be evident from Figure 1 that when an element 38 is released by receipt of a light response from the photoelectric unit 10, this element will successively operate switches 126, 127 and 128, and in each instance the time interval from the instant of actuation by the photoelectric unit until operation of that particular switch (assuming constant speed of rotation of wheel 37), will depend upon the positioning of the switch about the wheel 37. As disclosed in said Patent No. 2,437,168, this positioning can be adjusted as desired.

In order to more effectively control the period during which each solenoid 26, 31 or 36 is energized in response to a given light actuation, it is possible to use the more elaborate arrangement of Figure 2. Each of the switches 126, 127 and 128 (in this instance switch 128 only is shown) can be supplemented by an extra switch 128a, to control a holding circuit for the relay 141. Relay 141 is provided with a winding 143 connected to the energizing circuit 142, which is controlled by the main switch 128. The switch 128a is included in a holding circuit 144 which comprises the holding winding 146, the movable and stationary relay contacts 147 and 148, and the battery 149. The main relay contacts 151 and 152 are connected in the energizing circuit for the solenoid 36, which includes the switch 134 and the battery 153. It will be evident that closure of switch 128 serves to energize the winding 146 and the relay 141 to close all of the relay contacts. Closing of the contacts 147 and 148 closes the holding circuit 144 for the winding 146, thus holding all of the contacts closed. Subsequently upon operation of switch 128a, the holding circuit 144 is broken, thus permitting the relay contacts to drop open. By changing the position of switch 128a with respect to switch 128 the time period of closure of the relay can be adjusted to a desired value.

It will be evident that other parts of the apparatus which have been indicated diagrammatically in Figure 1, are incorporated in the apparatus of Figure 8 and are suitably and conveniently mounted upon the tractor. Such parts as the amplifiers and relays are conveniently mounted upon the tractor within the box 161. The timer wheel 37 has a drive connection to a portion of the tractor transmission so that it is driven at a rate corresponding to the forward movement of the vehicle. The timer can be conveniently carried within the box or enclosure 161, and can be connected to the transmission of the tractor by means of a suitable flexible drive. Likewise it will be apparent that suitable tanks or bins, together with suitable agitators known to those familiar with spray and dusting equipment, can be mounted upon the tractor to supply the fertilizing, spraying and/or dusting devices.

Operation of the complete apparatus can now be described as follows: The machine is to be used where plants are grown in relatively straight rows, as for example in raised beds with two rows to the bed. The plants will be spaced apart a distance varying in different instances. For example on plants such as lettuce, the spacing may be of the order of from 10 to 14 inches, for sugar beets from 8 to 18 inches, for cotton from 12 to 30 inches. The photoelectric unit 10 is set to operate at a suitable height above the ground surface, depending upon the particular plant being operated upon, and depending upon the plant size. Where the plants are relatively small the unit can be made to operate fairly close to the ground surface, as illustrated in Figure 8. For the larger plants it is necessary to operate at a greater height from the ground. In any event it is desirable to have unit 10 arranged whereby in passing over the plant row, the plants are bent over, and a light indicated secured from the bent over stem portions of the plant or the lower leaves which indicate the center of the plant with reasonable accuracy. Upon receipt of a reflected light indication from a plant by the photoelectric unit, the solenoid 16 of the timer is immediately operated, and an element 38 released. This element thereupon moves together with the wheel 37 to effect successive operation of the switches 126, 127 and 128. Upon operation of switch 126 the solenoid 26 is energized for a short interval to open valve 23, and thus to discharge a given quantity of powdered fertilizer upon the ground surface adjacent the plant. Assuming that one uses the shoe 115 of Figure 8, then a quantity of the fertilizer is applied adjacent the plant and in the trough formed by the shoe. The time delay between receipt of the response and operation of the solenoid 26 is determined by timer 17 and is such that the fertilizer is applied in close proximity to the same plant which caused the response. Operation of the switch 127 causes actuation of solenoid 31 to discharge a liquid spray from the nozzle 28. Here again the time interval following the receipt of the light response is such that when the spray is applied the same plant which caused the light response is within the curtains 124. Operation of switch 128 similarly causes energizing of solenoid 36 with the result that a powdered material, such as an insecticide or fungicide, is discharged upon the same plant.

It will be evident from the foregoing that my machine is capable of wide usefulness for various agricultural operations on plants, and is susceptible to many modifications and variations to suit different requirements. For example with respect to liquid spray materials it is evident that liquids having insecticidal properties can be used, as well as liquids having substances which affect the plant growth or its life cycle, including such substances as plant hormones, chemicals for controlling diseases such as chlorosis, and the like. In addition to using a liquid spray directly upon the plants it is possible to use one or more spray nozzles arranged to discharge liquid spray upon weeds growing around and between the plants. The liquid supplied to such nozzles can likewise be controlled automatically from the photoelectric unit 10, whereby such weed control sprays can be applied between the plants as well as alongside of the same, thus eradicating weeds which otherwise would require removal by cultivation. In this instance control from the photoelectric unit serves to shut off discharge of the spray, to prevent its application to the plants. In many instances it may not be desirable or necessary to carry out more than one plant treatment operation under the control of the photoelectric unit. For example the machine may be used for selective fertilizer applications, without application of any sprays or insecticides. Likewise it is possible to apply liquid spray or powdered material without any fertilizing.

It will be evident that the use of my machine makes possible important economies in the use of fertilizers, sprays, insecticides, and other materials which can be selectively applied. Because of the economies effected greater care can be exercised to provide for fully adequate application.

Previous references has been made to the special amplifiers 13 and 14, together with the relay 15, which secure responses resulting from the reflection of light from lamp 12, while at the same time the apparatus is immune to daylight and extraneous sources of light. It is suitable for this purpose to utilize the circuit illustrated in Figure 7, and which is disclosed in Patent No. 2,596,591.

The amplifying means in this instance includes the cascade connected vacuum tubes 176 and 177. The particular tubes illustrated are of the triple grid amplifier type, such as tubes known by manufacturers' specifications as No. 6SJ7 or 6AC7W. Resistance coupling is provided between the photoelectric tube and the input of tube 176. Conductor 178 is connected to one side of the photoelectric tube 11, and is grounded. Conductor 179 connects the other side of the photoelectric tube (the anode) to the grid 182, in series with the coupling condenser 184. Coupling resistor 186 connects across conductors 178, 179 and a leak resistor 187 connects between condenser 178 and the grid 182. The cathode 183 and the grid 181 are connected to ground through the biasing resistor 188. The anode 189 of tube 176 is connected in series with the resistor 191 to the conductor 192, which in turn is connected to a source of plate supply voltage through the resistor 193. In a typical instance the voltage of the plate supply can be of the order of 350 volts.

Conductor 192 connects to ground through the series connected voltage regulating tubes 194, 195. These tubes can be of the type known by manufacturers' specifications as VR150. Voltages are applied to the anode of the tube 176 by means of the resistors 196 and 197, which function as a filter in conjunction with condenser 198, and as a voltage divider in conjunction with resistor 186.

The second grid 199 of tube 176 is connected to ground through the by-pass condenser 201, and is also connected to conductor 192 through the resistor 202, whereby suitable voltage is maintained upon the grid.

The vacuum tube 177 has its grid 203 connected to an adjustable tap on resistor 204, which in turn has its one end grounded, and its other end connected to the plate 189 of tube 176 through the series coupling condenser 206. Adjusting the setting of the tap on resistor 204 serves as a sensitivity adjustment. The grid screen 207 of tube 177 connects with the cathode 208, and thence to ground through the resistor 209. Grid 211 connects to ground through the by-pass condenser 210, and to the conductor 192 through the resistor 212, whereby suitable voltage is maintained upon the grid with respect to the potential maintained on the cathode. The plate 213 of tube 177 is connected by the conductor 192 to a suitable tuned circuit 214 consisting in this instance of the inductance 216 and shunt capacitance 217. This circuit is tuned to the frequency of the light source whereby the amplifying system is responsive only to pulsations of substantially the same frequency.

Condenser 218 serves to couple the plate 213 of tube 177 to the grid 219 of another vacuum tube 221. This tube can be of the thyratron type such as a three element tube known by manufacturers' specifications as No. 884 or a tube of the shielded grid type known as No. 2050. The cathode 222 of thyratron 221 is grounded as indicated, and the grid is connected to a suitable source of negative bias through the series resistors 223, 224. Condensers 226, 227 are shown connected from the negative bias to ground, and from the mid-connection between resistors 223, 224 and ground.

In conjunction with the thyratron 221, and taking the place of the relay 15 of Figure 1, there is a relay 228 provided with two sets of contacts 1, 2 and 3, 4. The stationary contact 2 connects to the plate 229 of thyratron 221. The cooperating movable contact 1 is connected by conductor 231 and the series resistor 232 to the grid 233 of another vacuum tube 234. This latter tube can be of the triode amplifier type such as a tube known by manufacturers' specifications as No. 6J5. The plate 236 of this tube is connected by conductor 237 to a suitable source of plate battery potential, such as a potential of the order of 250 volts. A cathode 238 is connected by conductor 239 to one terminal of the coil 241 of relay 228. The other side of this coil connects to the stationary contact 4. Grid 233 is also connected to ground through the resistor 242.

The release coil 16 of the timer has its one terminal connected by conductor 262 to the conductor 231, and thus to the movable contact 1, and its other terminal connected by conductor 263 to one side of a current supply condenser 264. The other side of this condenser is grounded. Conductor 263 also connects to conductor 237 through the resistor 266. Switch 41, which in this instance is normally open, has its one side grounded and its other side connected by conductor 267 to the stationary contact 4 of the relay. In addition this conductor is connected to one side of a simple push-button or switch 268, the other side of which is grounded. A single switch 269 has been shown in this case for controlling a circuit including the solenoid 271 for operating the spray application valve 272. One terminal of solenoid 271 is connected to switch 269 and to ground, and the other side is connected by conductor 273 to the conductor 237 and to the plate current supply of tube 234, through the series resistor 274. Also conductor 273 is connected to one side of the current supply condenser 276, the other side of which is grounded. A small signal or indicator lamp 277 of the neon or glow-discharge type is shown connected between conductor 263 and ground, in series with the resistor 278.

Assuming operation of the amplifier system described above at a frequency of the order of 230 cycles per second, the various resistors and condensers included in the network may have values as follows: Resistors 186, 187, 196 and 197, 2 megohms; resistor 188, 1200 ohms; resistor 193, 7500 ohms; condenser 198, 20 mfd.; resistor 191, 220,000 ohms; condensers 184 and 206, 0.01 mfd.; condenser 201, 20 mfd.; resistors 202 and 204, 1 megohm; resistor 209, 500 ohms; condenser 210, 20 mfd.; resistor 212, 150,000 ohms; resistor 223, 100,000 ohms; resistor 224, 10,000 ohms; condenser 226, 0.25 mfd.; condenser 227, 0.025 mfd.; condenser 218, 0.01 mfd.; condenser 264, 20 mfd.; resistor 266, 5,000 ohms; resistor 274, 5,000 ohms; resistor 232, 150,000 ohms; resistor 242, 200,000 ohms; condenser 276, 30 mfd.; and resistor 278, 100,000 ohms.

Operation of the amplifier system shown in

Figure 7 is as follows: Lamp 12 is started in operation by the use of a suitable starting arrangement, and switch 280 is then momentarily manually closed, and the coil 241 energized by current supply from the cathode of the tube 234. Closing of the contacts of this relay causes the relay to be locked closed because the closing of contacts 3 and 4 completes the holding circuit to ground through the coil 241. The grid 219 of the thyratron 221 is biased at this time in such a manner that the plate to cathode impedance is relatively high. The plate current source connected to conductor 237 charges condenser 264 through resistor 266, and also charges condenser 276 through resistor 274. As long as condenser 264 is charged the small neon indicator lamp 277 is illuminated. Assuming now that a plant passes beneath the glass plate of the photoelectric unit, it causes a reflected light indication to fall upon the photoelectric tube, whereby pulses of a frequency corresponding to the frequency of the light are applied to the input of the amplifier tube 176, and amplified pulses are impressed upon the input of the amplifier tube 177. The amplification system is responsive only to pulses of the light frequency because of the action of the resonant circuit 214. When tube 177 receives amplified pulses plate 213 assumes a potential differing from the potential of the thyratron grid 219, and therefore the potential of the thyratron grid is changed whereby the thyratron is fired, or in other words, the plate to cathode impedance is reduced to a relatively low value. When this occurs the condenser 264 discharges through a circuit including the timer coil 16, relay contacts 1 and 2, and the plate to cathode path of the thyratron, to effect release of the star wheel of the timer to thereby release one of the elements 38. Discharge of the condenser 264 as described causes the lamp 277 to be extinguished.

Simultaneously with the discharge of condenser 264 the potential of conductor 231 and grid 233 of tube 234 is reduced from the relatively high positive value of the order of say 200 volts, to a relatively low value. This serves to block the plate current of tube 234, or in other words, to provide a relatively high plate to cathode impedance. As a result flow of holding current to the relay coil 241 is interrupted or reduced to a relatively low value, whereby the contacts of the relay are released. Release of the relay renders the network inoperative insofar as further pulses from the photoelectric tube are concerned. Upon release of the relay 228 the opening of contacts 1, 2 permits the grid 233 of tube 234 to again resume a relatively high positive value with the result that the plate to cathode impedance of this tube is again made relatively low.

When the released element 38 has traveled sufficiently far to operate the switch 41, closing of this switch establishes a current flow through coil 241 of the relay, with the result that the relay is again closed to cause the apparatus to be conditioned to receive another light response. When the released element reaches the operating switch 269, its circuit is closed which includes solenoid 271 and the condenser 276, whereby this condenser discharges through the solenoid to open the valve 272. Immediately upon discharge of the condensers 264 and 276 in the manner described above, they are recharged by current supply from the plate current supply connected to conductor 237.

This application is a continuation-in-part of subject matter disclosed in my co-pending application Serial No. 567,852, filed December 12, 1944, now Patent No. 2,502,468, and entitled "Agricultural Machine and Apparatus."

I claim:

1. In an agricultural machine of the character described, a frame adapted to be moved along a plant row, a photoelectric unit carried by the frame and adapted to be moved in proximity with the plants of the row, whereby light indications are secured by said unit from the individual plants of the row, means carried by said frame for selectively applying insecticidal material to the plants of the row, means including a timing device controlled by said photoelectric unit and serving to effect selective timed operation of said last named means.

2. In an agricultural machine, a frame, a photoelectric unit carried by the frame and adapted to traverse the plant row in proximity with the plants, said unit serving to receive light indications from individual plants of the row, means carried by said frame a fixed distance behind said unit and serving to apply fertilizer to the plants of the row, and means including a timing device controlled by said photoelectric unit and serving to effect selective operation of said fertilizer applying means, whereby fertilizer is selectively applied only to regions adjacent the plants.

3. In an agricultural machine of the character described, a frame adapted to be moved along a row of plants, a photoelectric unit carried by the frame and adapted to be moved along a plant row in proximity with the plants, said unit receiving light responses from the individual plants, powder dusting means carried by the frame behind said photoelectric unit, and means including a timing device controlled by said photoelectric unit and serving to effect selective timed operation of said plant dusting means to effect selective application of powder to individual plants.

4. In agricultural apparatus of the character described, a photoelectric unit, means for moving the unit in close proximity with a plant row whereby the unit receives light indications from the individual plants in the row, means moving along the plant row a fixed distance behind said photoelectric unit adapted to be controlled to apply material to the individual plants, a timing device controlled by said photoelectric unit, and means controlled by said timing device for causing selective operation of said second named means.

5. An agricultural apparatus of the character described, a photoelectric unit, means for moving the unit in close proximity with a plant row whereby the unit receives successive light indications from the individual plants in the row, at least two appliances moving along the plant row at different fixed distances behind said photoelectric unit, each of said appliances being adapted to be controlled to selectively apply material to the individual plants, a timing device controlled by said photoelectric unit, means controlled by said timing device for causing selective operation of one of said appliances to thereby selectively apply material to the individual plants, and means controlled by said timing device for causing selective operation of the other appliance to thereby apply material to the individual plants, said timing device including means serving to effect operation of means for operating the appliances in sequential order on successive plants of the row.

References Cited in the file of this patent

UNITED STATES PATENTS

| Number | Name | Date |
|---|---|---|
| 612,321 | Evans | Oct. 11, 1898 |
| 1,033,168 | Harden | July 23, 1912 |
| 1,252,923 | Moench | Jan. 8, 1918 |
| 1,354,215 | Saladiner | Sept. 28, 1920 |
| 1,382,017 | Saladiner | June 21, 1921 |
| 1,439,461 | Wood | Dec. 19, 1922 |
| 1,465,557 | Oldham | Aug. 21, 1923 |
| 1,611,774 | Peel | Dec. 21, 1926 |
| 1,727,526 | Thompson | Sept. 10, 1929 |
| 2,072,948 | Geffs | Mar. 9, 1937 |
| 2,177,803 | Ferte | Oct. 31, 1939 |
| 2,238,872 | Mather | Apr. 15, 1941 |
| 2,251,306 | Thompson | Aug. 5, 1941 |
| 2,289,986 | Nelson | July 14, 1942 |
| 2,400,562 | Marihart | May 21, 1946 |
| 2,401,396 | Wolfner | June 4, 1946 |
| 2,433,560 | Hurley | Dec. 30, 1947 |
| 2,502,468 | Marihart | Apr. 4, 1950 |
| 2,520,680 | Hamilton | Aug. 29, 1950 |
| 2,596,591 | Packard | May 13, 1952 |

FOREIGN PATENTS

| Number | Country | Date |
|---|---|---|
| 24,137 | Great Britain | of 1902 |
| 590,152 | Great Britain | July 9, 1947 |

OTHER REFERENCES

Seymour: "The Garden Encyclopedia," published 1939 by Wm. H. Wise & Co., N. Y., pp. 393, 394, 395, 459 through 463, 1119 through 1124.